US009635109B2

(12) United States Patent
Iliadis et al.

(10) Patent No.: US 9,635,109 B2
(45) Date of Patent: Apr. 25, 2017

(54) ENHANCING RELIABILITY OF A STORAGE SYSTEM BY STRATEGIC REPLICA PLACEMENT AND MIGRATION

(71) Applicant: International Business Machines Corporation, Armonk, NY (US)

(72) Inventors: Ilias Iliadis, Rueschlikon (SZ); Elliot K. Kolodner, Haifa (IL); Dmitry Sotnikov, Givataim (IL); Paula K Ta-Shma, Tel Aviv (IL); Vinodh Venkatesan, Horgen (SZ)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 14/146,014

(22) Filed: Jan. 2, 2014

(65) Prior Publication Data

US 2015/0186411 A1    Jul. 2, 2015

(51) Int. Cl.
  *G06F 17/30* (2006.01)
  *H04L 29/08* (2006.01)
  *G06F 11/14* (2006.01)
  *G06F 11/00* (2006.01)

(52) U.S. Cl.
  CPC ........ *H04L 67/1097* (2013.01); *G06F 11/008* (2013.01); *G06F 11/14* (2013.01); *G06F 11/1456* (2013.01); *H04L 67/1095* (2013.01); *G06F 11/1464* (2013.01)

(58) Field of Classification Search
  CPC .................................................. G06F 11/14
  See application file for complete search history.

(56) References Cited

U.S. PATENT DOCUMENTS

| 7,330,997 | B1* | 2/2008 | Odom ................. G06F 11/1464 711/162 |
| 7,536,426 | B2 | 5/2009 | Chen et al. |
| 8,010,648 | B2 | 8/2011 | Ogus et al. |
| 8,074,107 | B2 | 12/2011 | Sivasubramanian et al. |
| 8,131,961 | B2 | 3/2012 | Rajan et al. |
| 2010/0017441 | A1* | 1/2010 | Todd ....................... G06F 9/546 705/7.28 |

(Continued)

OTHER PUBLICATIONS

Ilias Iliadis et al., Reliability of Geo-Replicated Cloud Storage Systems, 2014, 2014 IEEE 20th Pacific Rim International Symposium on Dependable Computing, pp. 169-179.*

(Continued)

*Primary Examiner* — Etienne Leroux
*Assistant Examiner* — Dara J Glasser
(74) *Attorney, Agent, or Firm* — Suzanne Erez; Adolph C. Bohnstedt (57) ABSTRACT

Machines, systems and methods for optimizing data replication in a distributed storage network, the method comprising determining a need to create a replica for a data item in a remote failure zone in a data storage network; creating a temporary replica of the data item in a local failure zone defined in the data storage network, in response to determining that it is beneficial to create the temporary replica in the local failure zone based on a cost versus reliability improvement analysis; attempting to create the replica in the remote failure zone; and removing the temporary replica from the local failure zone, in response to successfully creating the replica in the remote failure zone.

16 Claims, 7 Drawing Sheets

(56) References Cited

U.S. PATENT DOCUMENTS

| | | | |
|---|---|---|---|
| 2010/0274762 A1 | 10/2010 | Murphy et al. | |
| 2011/0082991 A1* | 4/2011 | Leman | G06F 11/1456 |
| | | | 711/162 |
| 2012/0166394 A1 | 6/2012 | Kim et al. | |
| 2015/0039847 A1* | 2/2015 | Modzelewski | G06F 3/065 |
| | | | 711/162 |

OTHER PUBLICATIONS

Calder et al., "Windows Azure Storage: A Highly Available Cloud Storage Service with Strong Consistency", SOSP '11 Proceedings of the Twenty-Third ACM Symposium on Operating Systems Principles, pp. 143-157, 2011.

Joe Arnold, "A Globally Distributed OpenStack Swift Cluster", SwiftStack Blog, Sep. 2012. Can be found at : http://swiftstack.com/blog/2012/09/16/globally-distributed-openstack-swift-cluster/.

Decandia et al., "Dynamo: Amazon's Highly Available Key-value Store", SOSP '07 Proceedings of twenty-first ACM SIGOPS symposium on Operating systems principles, pp. 205-220, 2007.

Swiftstack, "OpenStack Swift Architecture—Introducing Swift", 2011. Can be found at : http://swiftstack.com/openstack-swift/architecture/.

Margaret Rouse, "Remote Replication", Essential Guide to Business Continuity and Disaster Recovery Plans, SearchDataBackup.techtarget.com, 2010. Can be found at : http://searchdatabackup.techtarget.com/definition/remote-replication.

Moody et al., "Design, Modeling, and Evaluation of a Scalable Multi-level Checkpointing System", SC '10 Proceedings of the 2010 ACM/IEEE International Conference for High Performance Computing, Networking, Storage and Analysis, pp. 1-11.

Cidon et al., "Copysets: reducing the frequency of data loss in cloud storage", USENIX ATC'13 Proceedings of the 2013 USENIX conference on Annual Technical Conference, pp. 37-48.

MacCormick et al., "Kinesis: a new approach to replica placement in distributed storage systems", ACM Transactions on Storage (TOS), vol. 4 Issue 4, Jan. 2009, Article No. 11.

* cited by examiner

ENHANCING RELIABILITY OF A STORAGE SYSTEM BY STRATEGIC REPLICA PLACEMENT AND MIGRATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to enhancing the reliability of a distributed storage system with multiple hierarchical failure zones, and more particularly to optimizing data replication strategy for vulnerable data based on an analysis of data communications bottlenecks in the system.

BACKGROUND

To enhance the reliability of data stored in a distributed storage network, duplicate copies of data (i.e., replicas) are stored at multiple failure zones. A failure zone, in general, refers to a group of hardware devices (e.g., disks, nodes, racks or datacenters) that may fail together. Failure zones can be hierarchical in structure with one zone being at a higher level of the hierarchy.

In other words, several failure zones at a first level (e.g. racks) can be part of a second failure zone (e.g. a datacenter). If data replicas are successfully distributed across different failure zones, localized failures will less adversely affect the recoverability of data across the entire network, since remotely stored replicas may be recovered from remote zones that remain unaffected by the local failure.

Unfortunately, copying data replicas between remote zones is typically associated with substantial delays, depending on the volume of data being duplicated, system capabilities, dynamic changes in system resources, etc. Lengthy delays are generally intolerable and especially disdainful if the delay increases the risk of loss for data that is being duplicated.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for optimizing data replication in a distributed storage network are provided. The method comprises determining a need to create a replica for a data item in a remote failure zone in a data storage network; creating a temporary replica of the data item in a local failure zone defined in the data storage network, in response to determining that it is beneficial to create the temporary replica in the local failure zone based on a cost versus reliability improvement analysis; attempting to create the replica in the remote failure zone; and removing the temporary replica from the local failure zone, in response to successfully creating the replica in the remote failure zone.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one or more embodiments, to avoid data loss due to delays in creation of remote data replicas across a distributed storage network, a temporary copy of the data may be made on a local node on which the target data (e.g., vulnerable data) is stored. In this manner, a local replica of the target data is readily available in case of the need for data recovery. That is, with the local copy in place, if a failure prevents or terminates the remote copy process, then at least the local replica is available for the purpose of recovery.

Depending on implementation, if the remote copy process fails, the remote copy may be attempted at a later time. If copying to the remote node is successful, then the local replica may be removed from the local node. The remote copy process may be initiated when a data item is created and one or more replicas are made for reliability purposes. Further, since having a sufficient number of replicas is important to maintaining a reliable recovery system, lost replicas may also be restored. The remote copy process may be also used when a replica for a previously created data item is lost.

The creation of remote replicas for a data item and the number of replicas created may be determined based on the level of resiliency desired for the data storage system. In one approach, several failure zones may be identified within a storage system and a hierarchical methodology may be utilized to create and maintain a certain number of replicas for a data item, desirably according to a cost-benefit analysis. As provided in further detail below, the cost-benefit analysis may take into account the value of making local temporary replicas for different target data items.

In accordance with one embodiment, a decision about whether one or more local replicas are needed for a certain data item is made in a dynamic way and based on specific cost-benefit tradeoffs calculated at that level. The cost may be determined based on identifying the resources needed to make the additional temporary replicas. The benefit may be determined based on a calculation of the expected improvement in system reliability, if the temporary replicas are made. The analysis may be performed in-real time for a particular level in an identified failure zone hierarchy as the availability of resources change.

Referring to FIGS. 1A through 1D, an example distributed storage network 100 is illustrated in which replicas are created and migrated. The amount of time for making a replica of a data item 1 stored on a first node in a first rack in a first data center (e.g., Site 1) may be calculated at different levels of hierarchy for identified failure zones based on the following factors: (1) time to make the replica on a second node on the same rack, (2) time to make the replica on a second node on a second rack in the same data center, (3) time to make the replica on a second node in a second rack in a second data center (e.g., Site 2), (4) time to make the replica on a second node in a second rack in a second data center in a different geographic area than the first data center, and so on.

Figure 1A:
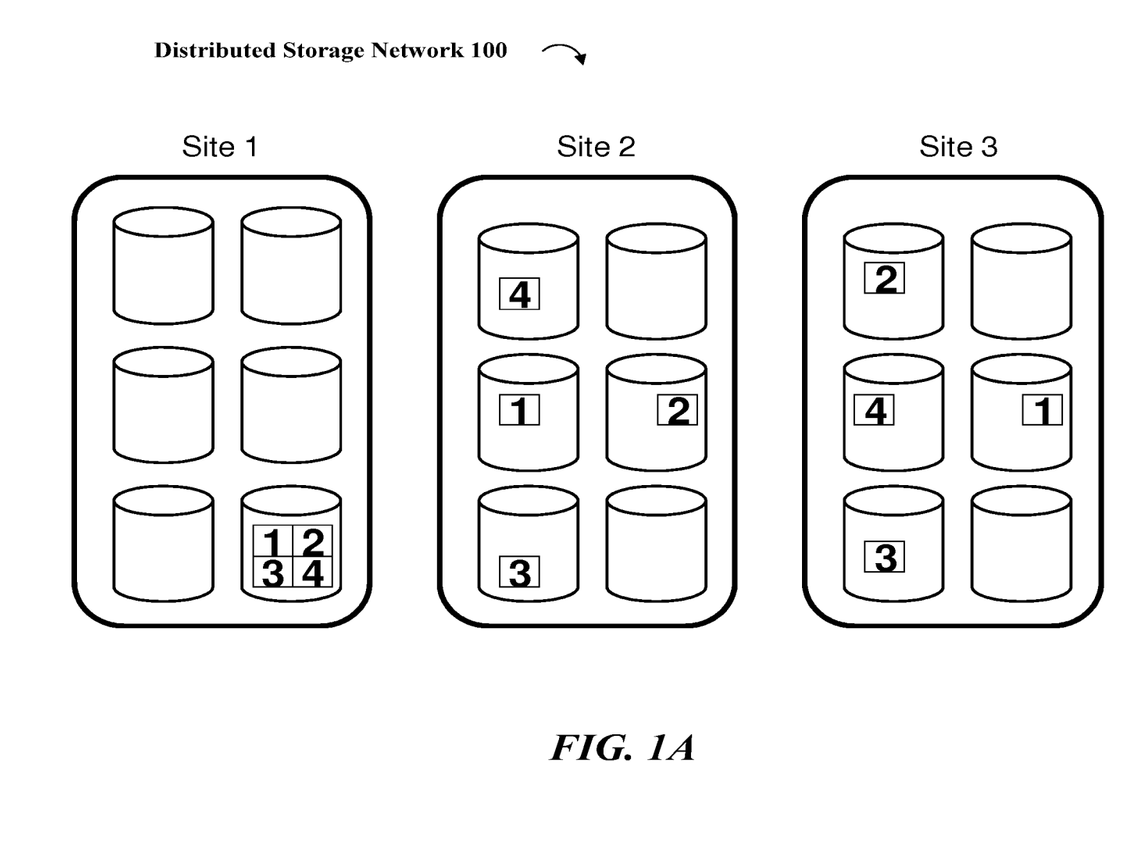
FIGS. 1A through 1D illustrate an exemplary distributed storage network in accordance with one or more embodiments in which replicas are created and migrated.
Figure 1B:
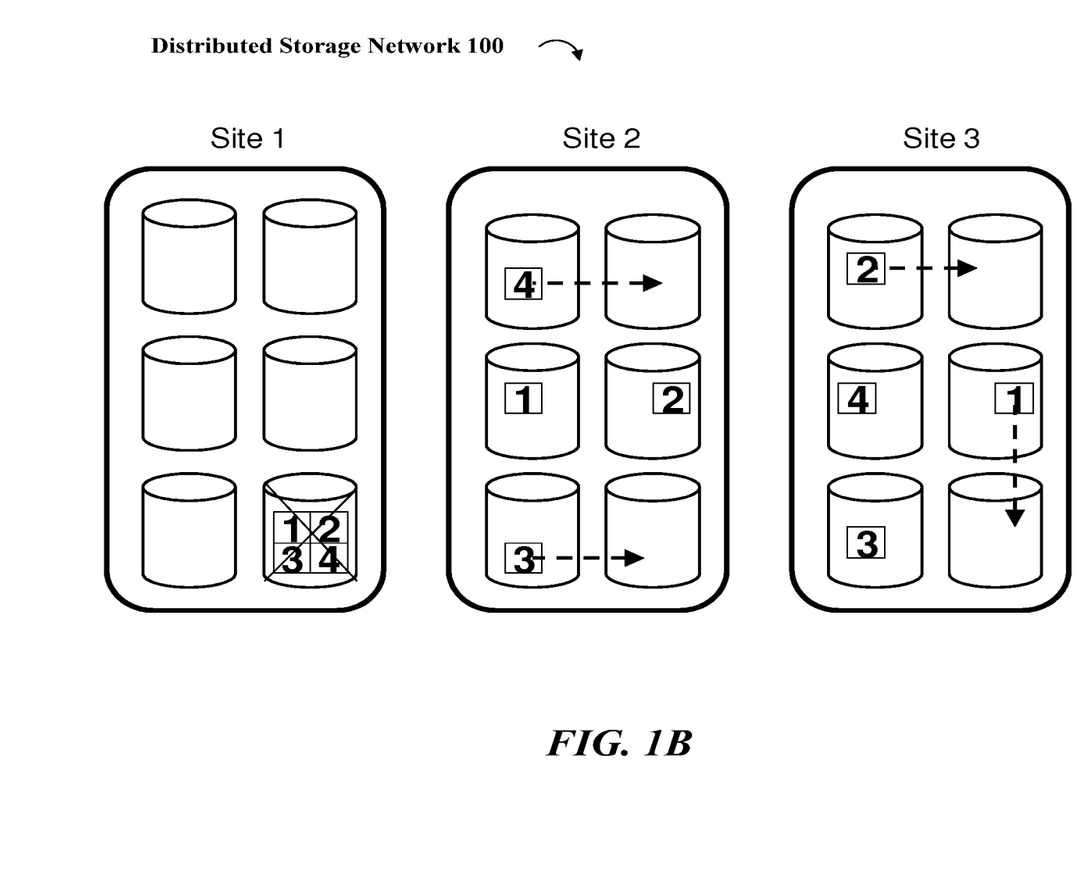
Figure 1C:
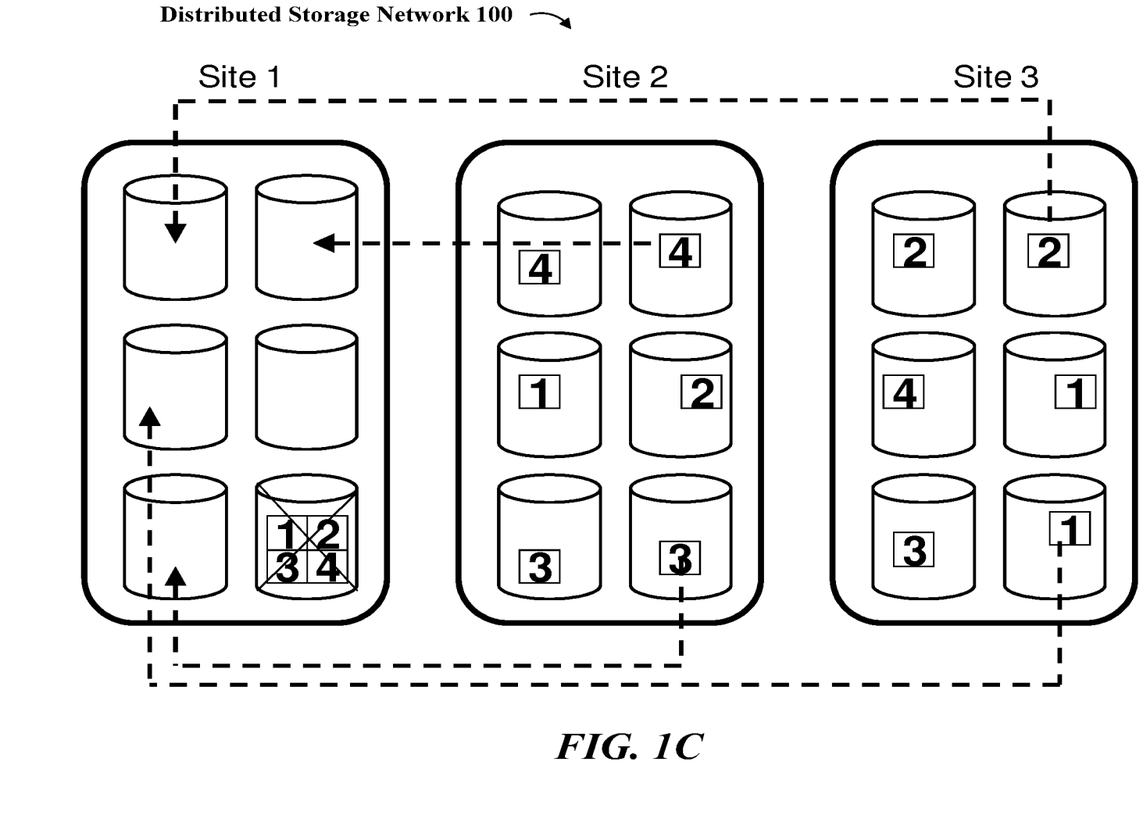
Figure 1D:
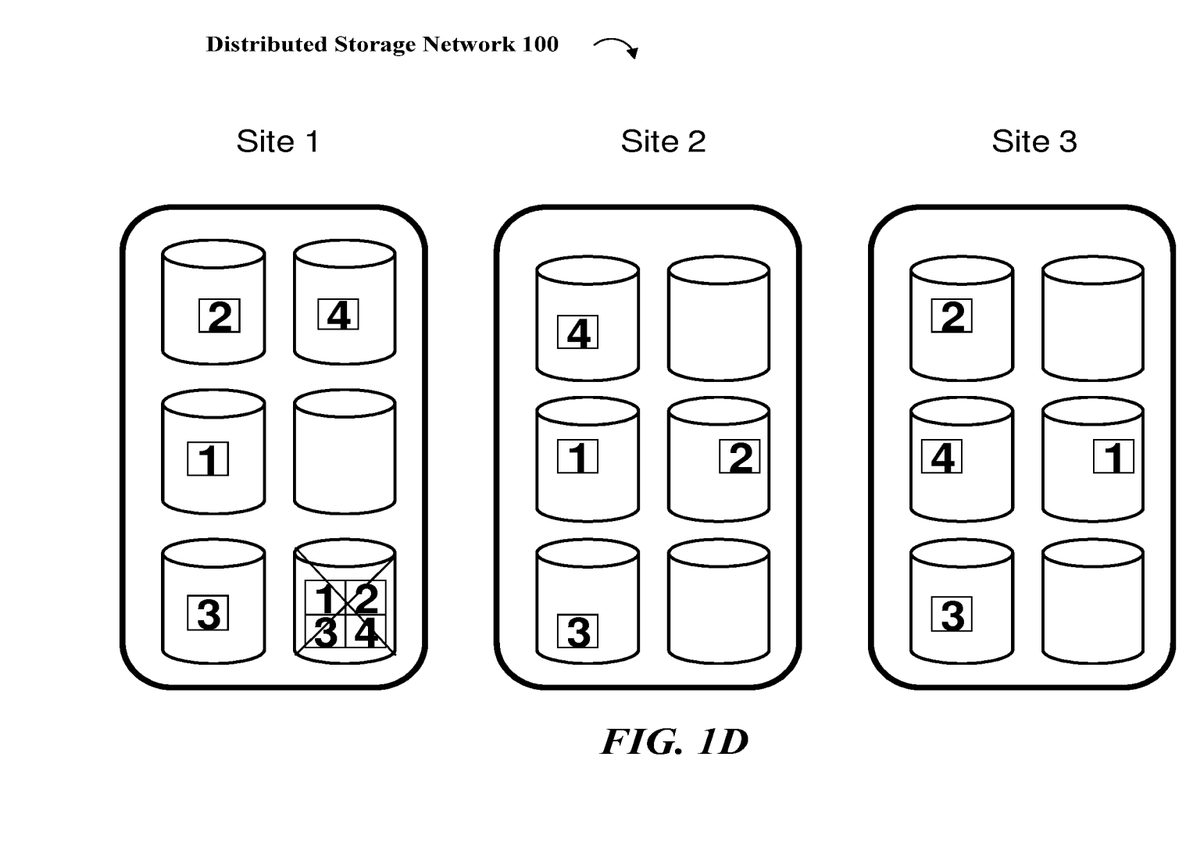
Figure 2:
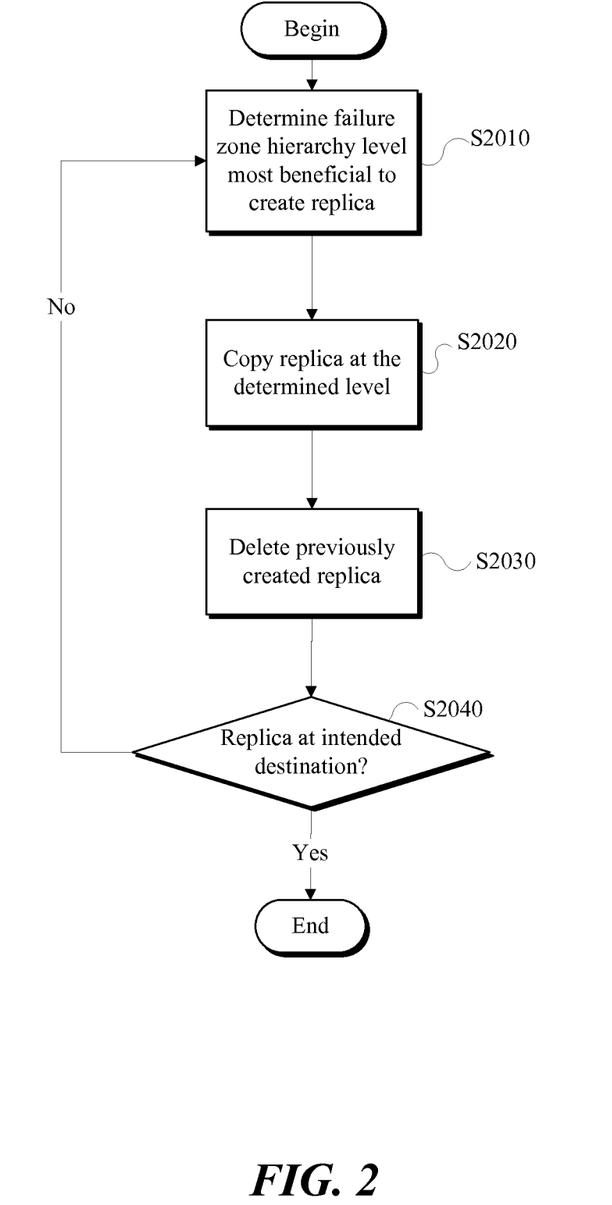
FIG. 2 is an exemplary method of storing data replicas in a distributed storage network, in accordance with one or more embodiments.

Referring to FIG. 2, it may be determined at which levels of failure zone hierarchy it is most beneficial to create one or more replicas (S2010). The determination may be based on a cost versus reliability improvement analysis, as provided in further detail below, and may result in the creation of one or more replicas at one or more levels of the failure zone hierarchy (S2020). See FIGS. 1A, 1B. FIG. 1B shows replicas created at different disks in the same site (data center). If prior replicas were previously created, such replicas may be deleted at certain failure zone levels (S2030). It may be determine if a replica is at the intended destination (S2040). If not, the process reverts back to the determining at S2010 until the replica is copied or migrated to the intended destination. See FIG. 1C, 1D. FIG. 1C shows migration of replicas to site 1, the intended destination. FIG. 1D shows the removal of prior (temporary) replicas.

In a more specific example, an improvement or decline in system reliability may be determined according to a mean time to data loss (MTTDL) metric that may be estimated based on the time that it takes to make one or more replicas for target data on one or more destination nodes, the number of replicas available for the target data, and the mean time to failure (MTTF) for different system components (e.g., at the local or other hierarchical levels) across the distributed storage network 100. The different system components may be the ones directly or indirectly utilized for facilitating the copying of the replicas to the destination nodes. Example system components are network switches, routers, different protocol adapters and ports, power supplies, mother-boards, CPU, RAM and storage media (e.g. hard disks, flash or tape media).

If it is determined that the estimated time (e.g., MTTDL or time for making a replica to a remotely located destination node) is beyond a certain threshold, then the replica may be copied locally either to the first node (e.g., the local node on which the data item is stored) or to a third node (e.g., another relatively local node). For example, if the target data is stored on the first node of the first rack in a first data center, the replica may be made on the same first node or on a first node on a second rack in the first data center, for example, if the estimated time for copying to a remote node on a different data center is beyond a certain threshold. If the estimated time is under the threshold, then the replica is copied to the intended destination.

As noted earlier, the locally copied replicas are desirably temporary in state. Once network conditions improve (e.g., when remote copying to a destination node may be achieved within an acceptable timeline), then a replica may be made on the intended remotely located destination node, and the local temporary replica may be removed. It is noteworthy that additional parameters, other than copy time, may be considered for determining whether a replica is to be copied on a particular node. For example, if the cost of the resources needed to make the temporary copy on a node is above a certain threshold or if there is a collocation limitation present, the replica may not be copied to that node or another node may be considered.

In one embodiment, the replica creation or copying may be performed incrementally by copying the data at several stages. In the earlier stages the replicas are stored on more local nodes (e.g., intermediary nodes with closer proximity to the source node) and at later stages the replicas are migrated to less local nodes (e.g., intermediary nodes with closer proximity to the destination node). The copying and the migration is performed considering the dynamic changes in system resources, costs involved in copying and the overall probability of data loss.

Copying to less local intermediary nodes may continue with incremental migrations toward more remote nodes until the ultimate copying of the replica to the intended destination node is achieved. The incremental migrations would advantageously increase the reliability of data recovery in the system, at each increment, even if the most favorable conditions for copying the replicas are not immediately present. Once the replica is copied to the ultimate destination node, the temporary replicas at the intermediate nodes may be deleted, in accordance with one embodiment.

In the above paragraphs, exemplary implementations are disclosed with reference to a simplified methodology. It is noteworthy that the above disclosed methodology may be further refined or expanded depending on strategy to apply to more complex scenarios. As such, without limitations, in the following, additional embodiments with similar or different features are provided as applicable in different scenarios. Some of the embodiments are disclosed in more detail than others. It should be noted however that the disclosed details and scenarios are by way of example and should not be construed as limiting the scope of the claimed subject matter to any particular specification.

In some scenarios, it may be recognized that failure in certain storage zones may be more likely. For example, loss of data due to a disk failure may be more likely than loss of data due to a node failure. And, loss due to node failure may be more likely than loss due to a rack failure, or a failure of an entire data center. Further, creating data replicas (i.e., replicating) within a particular failure zone may be faster and less expensive than replicating data between separate failure zones. Accordingly, data reliability in a distributed storage network may be improved by first protecting against the most likely cause of failure and subsequently protecting against less likely causes of failure.

In one implementation, a staged rebuild may begin at the lowest level of the failure zone hierarchy (e.g., at the disk level). The rebuild may optionally involve replicating the target data in separate failure zones at this level (i.e., in different disks), but in the same failure zone at the next level (e.g., in the same node). Then, for a subsequent level z in the failure zone hierarchy, the local replicas may be migrated to a separate failure zone at level z, but still in the same failure zone at level z+1. For example, the replicas may optionally be migrated to separate nodes in the same rack. They may then optionally be migrated to separate racks in the same data center. Finally, the replicas may be migrated to another data center (i.e., the intended destination).

In one or more embodiments, replicas may be migrated to different nodes on the same rack, and then migrated to different racks in the same data center, and then to different data centers in the same region. The above scheme advantageously offers immediate protection against the most likely case of failure by replicating within a failure zone lower in the hierarchy, and also provides for faster recovery by replicating within a failure zone, and therefore restores redundancy faster, so that the probability of additional failures within a time period is reduced.

For a level of the failure zone hierarchy there may be a tradeoff between the costs of performing the above noted optimization, through the staged rebuild process and the additional protection provided against data loss. The associated cost may be measured in terms of additional I/Os, additional temporary storage space, additional power, or additional overall latency for the recovery operation. As noted earlier, the additional protection may be measured in terms of the MTTDL improvement, which depends on several factors, including system setup configuration and related properties (e.g., number and type of disks, nodes, racks, etc.) in the distributed storage system.

Some of the other properties that may be taken into consideration include available bandwidths between the different components of the system, the placement of data in the system, the specific details of the creation of additional copies, and the probability of failure of components at each level of the failure zone hierarchy. For each level, the added level of protection gained versus the additional cost incurred in order to achieve the gain may be calculated. The result of the calculation may be used to autonomously decide at which levels this optimization is beneficial. The optimization may be then applied to the levels that would benefit from it.

In the following example embodiments, different heuristics are provided. In one example, data is replicated locally instead of remotely in case of temporary node or network failure, in order to provide high availability. This solution does not deal with permanent failures. One optional approach, that deals with permanent failures at multiple levels of the failure zone hierarchy takes a global view of the multiple levels and makes intelligent decisions regarding at which levels in the hierarchy to perform the optimization by analyzing a particular level individually and also taking into account the overall system.

Systems and methods disclosed herein advantageously cope with permanent failures and consider rebuilding across multiple levels in the failure zone hierarchy based on a global view. In one embodiment, a multi-level checkpointing scheme may be implemented for making high performance clusters (HPC) resilient against failures. When a large application is run in an HPC system, a checkpoint of the state of the process is written to a parallel file system, so that upon failure the application may be restarted from the previous checkpoint. Although writing to the parallel file system makes the system resilient (e.g., because it protects against the failure of the entire machine), such parallel writing may be slow.

To optimize the above process, a multi-level checkpointing scheme may be implemented that allows applications to take frequent inexpensive checkpoints at the node level and less frequent, more resilient checkpoints at the file system level resulting in better efficiency and reduced load on the parallel file system. In this embodiment, the system creates replicas to restore redundancy after a failure has occurred, whereas in the case of multi-level checkpointing the system creates checkpoints in anticipation of a failure.

Accordingly, the above optimization method may be used at each level of the failure zone hierarchy and enables decisions to be made globally and dynamically regarding the best strategy for creating replicas. In the case of multi-level checkpointing, checkpoints may be performed according to a fixed static schedule. For example, once an hour an inexpensive checkpoint may be created at the node level and once a day at the parallel file system level. A determination may be made about the type of checkpoint that is to be taken and the possibilities to later upgrade to a more resilient type performed in a global and dynamic fashion.

In one embodiment, an optimization method may be employed based on a bottleneck analysis. For example, consider the bandwidth currently available for replicating data at each level of the hierarchy. If at one level the available bandwidth is significantly higher than the next level up in the hierarchy, then optimization is performed. For instance, if the current bandwidth available between two nodes is 10 Gbits, between two racks is 10 Gbits, between two data centers is one Gbits and between two regions is one Gbits, then one should perform the optimization at the data center level.

In the above example, the system may be configured to make a copy of the data residing at a disk to another rack in the same data center, and subsequently migrate the copy to a different data center in a different region. A bottleneck analysis of the system may be completed in this example. If a bottleneck exists at this level, then the optimization may be performed at the level where the bottleneck is detected.

Under the above heuristic, the expectation is for a delay in copying the data to a separate data center, in comparison to the speed the replica may be copied to a different rack in the same data center. The heuristic may thus suggest making a durable copy of the data before encountering the expected delay in order to reduce the chance of additional failures occurring prior to the rebuild completion.

In one embodiment, rebuilding is performed at various levels and the corresponding MTTDL of the system may be obtained by taking into account factors such as MTTF of each component of the system, including expected likelihood of entire zone failures, available bandwidth for creating additional replicas at levels of the failure zone hierarchy, assess the benefit of performing the optimization at each level in terms of the resulting improvement in MTTDL.

Depending on implementation, costs associated with one or more of (1) performance costs of additional I/Os, (2) additional temporary disk space needed, and (3) additional power costs for additional I/Os may be considered and a decision may be made as to which levels to perform the optimization.

In one embodiment, the optimization may be performed based on the expected amount of data that may be lost in case of a failure. Accordingly, rebuilding may be performed at various levels and the corresponding expected amount of data lost in the system may be calculated by taking into account factors such as MTTF of one or more components of the system, including: expected likelihood of entire zone failures (e.g. rack, data center or region failures), bandwidth available for creating additional replicas at a level of the failure zone hierarchy, etc.

In the above example, the benefits of performing the optimization at each level in terms of the resulting improvement in the expected amount of data lost may be determined and compared to costs associated with at least one of: (1) performance costs of additional I/Os, (2) additional temporary disk space needed, and (3) additional power costs for additional I/Os. A decision may be then made to determine at which levels to actually perform the optimization.

In one embodiment, optimization method may be based on cost analysis. For example, rebuilding may be performed at various levels considering costs associated with at least one of: (1) performance costs of additional I/Os, (2) additional temporary disk space needed, and (3) additional power costs for additional I/Os. In addition, service level agreements (SLAs) may be taken into account, wherein the SLAs were signed with customers, under which some data items are deemed more expensive to lose than others. In this scenario, a decision may be made to determine at which levels to actually perform the optimization and for which data.

In accordance with one embodiment, a cost versus reliability improvement analysis may be performed for multiple levels (and optionally at all levels, i.e. an entire virtualized network, data-center, rack and node level). Based on the analysis the best solution for copying temporary replicas across the different levels may be calculated. Once the copies of the replicas are made, the calculation may be repeated to determine whether any of the replicas may be migrated to higher failure zones in the hierarchy, until the replica reaches the final destination node.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
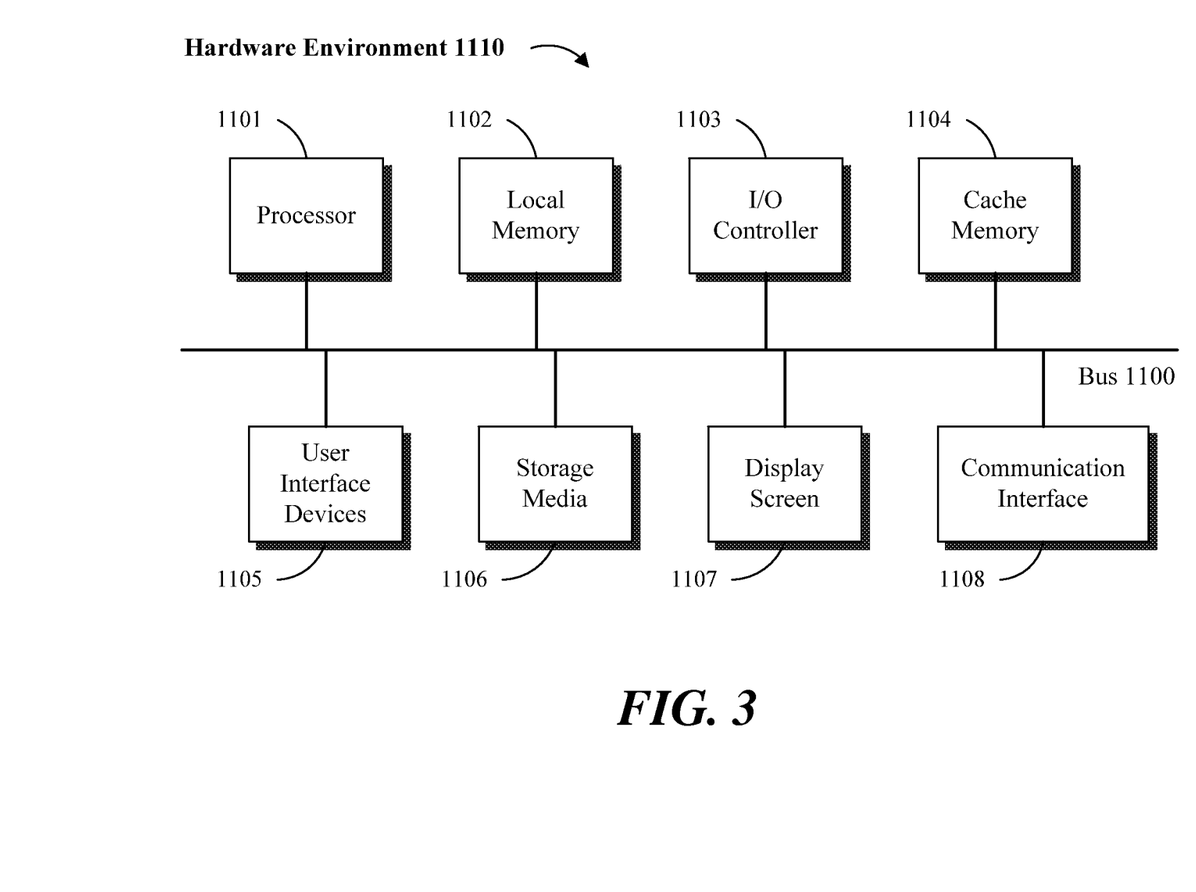
FIGS. 3 and 4 are block diagrams of hardware and software environments in which the disclosed systems and methods may operate, in accordance with one or more embodiments.
Figure 4:
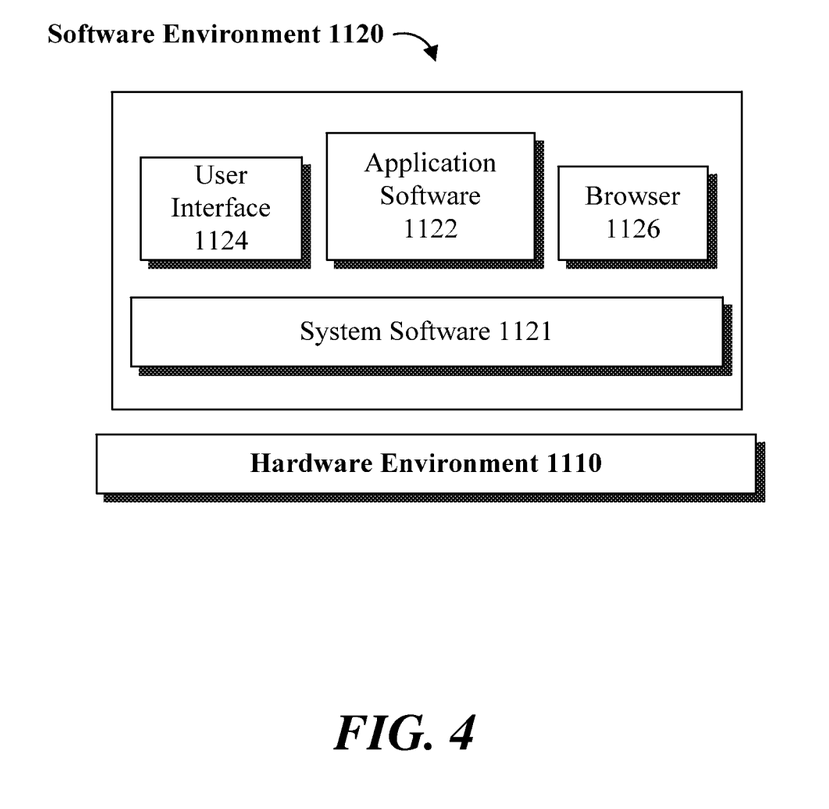

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method comprising:
    determining, by one or more processors, a need to replicate a portion of data into a remote failure zone within a data storage network;
    generating, by the one or more processors, a cost versus reliability improvement analysis, wherein the cost versus reliability improvement analysis includes an estimate of a mean time to failure (MTTF) for network switches, routers, protocol adapters, protocol ports, power supplies, mother-boards, CPUs, RAM, and storage media; and
    based, at least in part, on the cost versus reliability improvement analysis, sequentially creating, by the one or more processors, two or more replicas of the portion of data, wherein an earlier-created replica is removed after a successive replica is created and each successive replica is more remote from the portion of data than any earlier-created replica.

2. The method of claim 1 further comprising:
    creating, by the one or more processors, one or more replicas on one or more nodes in the data storage network that are managed based on a hierarchical approach, wherein the cost versus reliability improvement analysis is applied to two or more hierarchical failure zone levels by:
        determining, by the one or more processors, to which of the two or more hierarchical failure zone levels it is most beneficial to create a replica based on the cost versus reliability improvement analysis; and
        creating, by the one or more processors, the one or more replicas in at least one of the two or more hierarchical failure zone levels until a final replica is migrated to a final destination node.

3. The method of claim 1, wherein the cost versus reliability improvement analysis is based on one or more of: existing network conditions, storage system conditions, and predicted failures of one or more computing resources.

4. The method of claim 1, wherein the cost versus reliability improvement analysis further comprises:
    estimating, by the one or more processors, a time requirement for creating one or more intermediate replicas of the portion of data in a first hierarchical failure zone level.

5. The method of claim 1, wherein the cost versus reliability improvement analysis further comprises:
    estimating, by the one or more processors, a cost associated with creating one or more intermediate replicas of the portion of data.

6. The method of claim 1, wherein the cost versus reliability improvement analysis further comprises:
    estimating, by the one or more processors, a cost incurred due to a potential loss of the portion of data.

7. The method of claim 1, wherein the cost versus reliability improvement analysis further comprises:
    determining, by the one or more processors, whether creating one or more intermediate replicas of the portion of data will meet or exceed a time threshold.

8. The method of claim 1, wherein the cost versus reliability analysis further comprises:
    determining, by the one or more processors, whether a cost associated with creating one or more intermediate replicas of the portion of data is below a cost threshold.

9. The method of claim 7, wherein the time threshold is based on a length of time associated with copying the one or more intermediate replicas of the portion of data and one or more limitations associated with making the one or more intermediate replicas of the portion of data.

10. The method of claim 1, wherein the cost versus reliability improvement analysis is based on one or more of: a length of time associated with copying one or more replicas of the portion of data to one or more hierarchical failure zone levels, and a current number of replicas of the portion of data.

11. The method of claim 1, wherein the cost versus reliability improvement analysis is applied to a failure zone hierarchy defined at least at: a disk, a node, a rack and a data center level in the data storage network.

12. The method of claim 11, wherein a data center includes one or more racks, a rack includes one or more nodes, and a node includes one or more disks.

13. A computer system comprising:
one or more computer processors;
one or more computer-readable storage media; and
program instructions stored on at least one of the one or more computer-readable storage media for execution by at least one of the one or more processors, the program instructions comprising:
program instructions to determine a need to replicate a portion of data into a remote failure zone within a data storage network;
program instructions to generate a cost versus reliability improvement analysis, wherein the cost versus reliability improvement analysis includes an estimate of a mean time to failure (MTTF) for network switches, routers, protocol adapters, protocol ports, power supplies, mother-boards, CPUs, RAM, and storage media; and
based, at least in part, on the cost versus reliability improvement analysis, program instructions to sequentially create two or more replicas of the portion of data, wherein an earlier-created replica is removed after a successive replica is created and each successive replica is more remote from the portion of data than any earlier-created replica.

14. The computer system of claim 13, wherein the cost versus reliability improvement analysis further comprises program instructions to:
estimate a time requirement for creating one or more intermediate replicas of the portion of data in a first hierarchical failure zone level.

15. A computer program product comprising:
one or more computer readable storage media and program instructions stored on at least one of the one or more computer-readable storage media, the program instructions comprising:
program instructions to determine a need to replicate a portion of data into a remote failure zone within a data storage network;
program instructions to generate a cost versus reliability improvement analysis, wherein the cost versus reliability improvement analysis includes an estimate of a mean time to failure (MTTF) for network switches, routers, protocol adapters, protocol ports, power supplies, mother-boards, CPUs, RAM, and storage media; and
based, at least in part, on the cost versus reliability improvement analysis, program instructions to sequentially create two or more replicas of the portion of data, wherein an earlier-created replica is removed after a successive replica is created and each successive replica is more remote from the portion of data than any earlier-created replica.

16. The computer program product of claim 15, wherein the cost versus reliability improvement analysis further comprises program instructions to:
estimate a time requirement for creating one or more intermediate replicas of the portion of data in a first hierarchical failure zone level.

* * * * *